US008746790B2

(12) United States Patent
Beaty Bishop

(10) Patent No.: US 8,746,790 B2
(45) Date of Patent: Jun. 10, 2014

(54) APPARATUS THAT ATTACHES TO A CHAIR TO PROVIDE STORAGE OR TO ASSIST WITH CHAIR TRANSPORTATION

(75) Inventor: Lisa Kay Beaty Bishop, Cape Girardeau, MO (US)

(73) Assignee: Leisureease, LLC., St. Louis, MO (US)

( * ) Notice: Subject to any disclaimer, the term of this patent is extended or adjusted under 35 U.S.C. 154(b) by 308 days.

(21) Appl. No.: 13/113,796

(22) Filed: May 23, 2011

(65) Prior Publication Data
US 2011/0221244 A1 Sep. 15, 2011

Related U.S. Application Data

(63) Continuation-in-part of application No. 12/609,749, filed on Oct. 30, 2009, now Pat. No. 7,975,654, which is a continuation of application No. 11/973,249, filed on Oct. 5, 2007, now Pat. No. 7,628,119.

(60) Provisional application No. 60/850,236, filed on Oct. 7, 2006.

(51) Int. Cl.
*A47C 7/62* (2006.01)
(52) U.S. Cl.
USPC ..................................... 297/188.08; 297/225
(58) Field of Classification Search
USPC ................... 297/17, 188.08, 225, 228.1, 229, 297/188.12, 188.13, 45
See application file for complete search history.

(56) References Cited

U.S. PATENT DOCUMENTS

| 1,820,104 | A | * | 8/1931 | Whaley | 297/224 |
|---|---|---|---|---|---|
| 1,825,909 | A | * | 10/1931 | Levi | 297/224 |
| 2,100,868 | A | * | 11/1937 | Oppenheimer, Jr. | 297/224 |
| 2,349,193 | A | * | 5/1944 | Pass | 297/225 |
| 2,820,510 | A | * | 1/1958 | Sugarman | 297/228 |
| 4,725,094 | A | * | 2/1988 | Greer | 297/229 |
| 5,690,380 | A | * | 11/1997 | Waters | 297/225 |
| 6,079,778 | A | * | 6/2000 | Lindberg | 297/223 |
| 6,354,661 | B1 | * | 3/2002 | Moss | 297/229 |
| 7,011,367 | B2 | * | 3/2006 | Riley | 297/228.1 |
| 7,240,964 | B2 | * | 7/2007 | Riley | 297/229 |
| 7,469,962 | B2 | * | 12/2008 | Paulin | 297/229 |
| 2005/0236876 | A1 | * | 10/2005 | Paulin | 297/219.1 |
| 2006/0175883 | A1 | * | 8/2006 | Neustat | 297/229 |
| 2008/0036254 | A1 | * | 2/2008 | Clarke et al. | 297/225 |

* cited by examiner

*Primary Examiner* — T. Nguyen
(74) *Attorney, Agent, or Firm* — Shook Hardy & Bacon LLP

(57) ABSTRACT

Subject matter described includes an apparatus that attaches to a chair to provide storage and to assist with carrying the chair. For example, the apparatus might include side panels that are attached to one another, such that the side panels contiguously extend around the chair legs when the apparatus is attached to a chair. In addition, the apparatus includes a top panel that extends from one of the side panels over the chair seat and that releasably fastens to one or more other side panels. The apparatus might also include a wrapping mechanism that attaches to a chair and that includes a releasable fastener. The releasable fastener is positioned to be fastened when the wrapping mechanism wraps around a collapsed chair.

20 Claims, 13 Drawing Sheets

APPARATUS THAT ATTACHES TO A CHAIR TO PROVIDE STORAGE OR TO ASSIST WITH CHAIR TRANSPORTATION

CROSS-REFERENCE TO RELATED APPLICATIONS

This application is a continuation-in-part of U.S. application Ser. No. 12/609,749, filed on Oct. 30, 2009. U.S. application Ser. No. 12/609,749 is a continuation of U.S. application Ser. No. 11/973,249 (now patented U.S. Pat. No. 7,628,119), filed on Oct. 5, 2007. U.S. application Ser. No. 11/973,249 claims the benefit of U.S. Provisional Application No. 60/850,236, filed on Oct. 7, 2006. U.S. application Ser. No. 12/609,749; U.S. application Ser. No. 11/973,249; and U.S. application Ser. No. 60/850,236 are incorporated herein by reference in their entirety.

BACKGROUND

Folding chairs are used in various settings, such as sporting events and park activities. One well-known style of folding chair includes a 20" by 20" folding chair in which a canvas seat and canvas backrest are stretched between, and supported by, a tubular frame. When unfolded and in a chair configuration, a space exists beneath the seat and between the various tubular-frame members. When the chair is collapsed, such as when being transported or stored, the tubular frame collapses into the space, thereby collapsing the canvas seat and canvas backrest. Often, a canvas folding chair will be accompanied by a separate bag that can be used to carry the canvas folding chair when collapsed.

SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

Subject matter described herein includes an apparatus that attaches to a chair to enclose a space underneath the chair seat. For example, the apparatus includes one or more side panels that are attached to one another, such that the side panels contiguously extend around the chair legs when the apparatus is attached to a chair. In addition, the apparatus includes a top panel that extends from one of the side panels over the chair seat and that releasably fastens to one or more other side panels.

Other subject matter described herein includes a wrapping mechanism that attaches to a chair and that includes a releasable fastener. The releasable fastener is positioned to be fastened when the wrapping mechanism wraps around a collapsed chair.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies.

Subject matter described herein includes an apparatus that attaches to a chair to enclose a space underneath the chair. The apparatus includes a series of panels that are attached to one another in an enclosure-forming arrangement. The panels might include a flexible material or fabric, such as nylon, that is able to withstand various elements (e.g., water, wind, dirt, etc.). In addition, the flexible material might be insulating or have other characteristic that render the apparatus suitable for desired uses. For example, when used to provide an under-seat enclosure for a pet, apparatus 110 of FIG. 1 might have more mesh-like portions than if apparatus 110 is used as a cooler for food and beverages. The chair might include a folding chair having a fabric seat and back rest (e.g., canvas) that are supported by a collapsible frame. Although canvas is described herein for exemplary purposes, the chair might be constructed of any flexible material that could be used as a seat or backrest.

Figure 1:
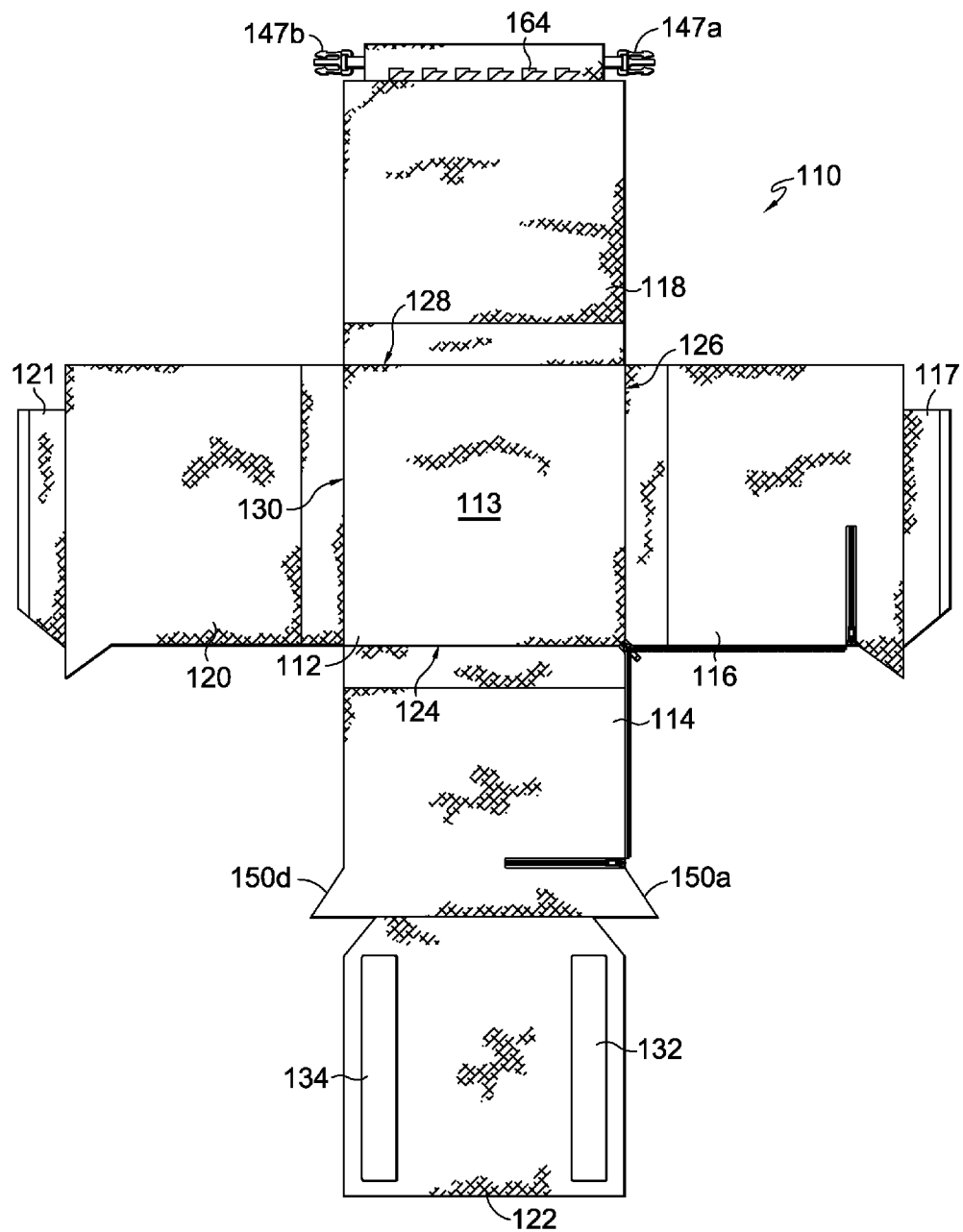
FIG. 1 depicts an aerial perspective of an apparatus in which panels are laid flat.

Referring now to FIG. 1, an apparatus 110 is depicted from an aerial perspective looking downward. The apparatus includes a base panel 112 and a set of side panels. The depicted side panels include a front panel 114, a left panel 116, a back panel 118, and a right panel 120. Each of the side panels extends from a respective edge of the base panel 112. For example, front panel 114 extends from a front edge 124 of the base panel 112; left panel 116 extends from a left edge 126 of the base panel 112; back panel 118 extends from a back edge 128 of the base panel 112; and right panel 120 extends from a right edge 130 of the base panel 112. The side panels might be attached to the base panel using various methods, such as by sewing or adhering the side panels to the base panel.

While FIG. 1 illustrates an exemplary set of side panels that includes four side panels, the set of side panels might alternatively include fewer or more than four side panels. For example, the set of side panels might include only one side panel that is attached contiguously around base panel 112. The number of side panels in the set might correlate to the number of sides of a shape formed by the base panel. For example, if the base panel includes a circular shape, the set of side panels might include only one side panel, and if the base panel includes a triangular shape, the set of side panels might include three side panels. However, in other embodiments the number of side panels does not necessarily directly correlate with the number of edges included on the base panel. For example, a single side panel might be contiguously attached around all four edges of base panel 112.

Figure 2:
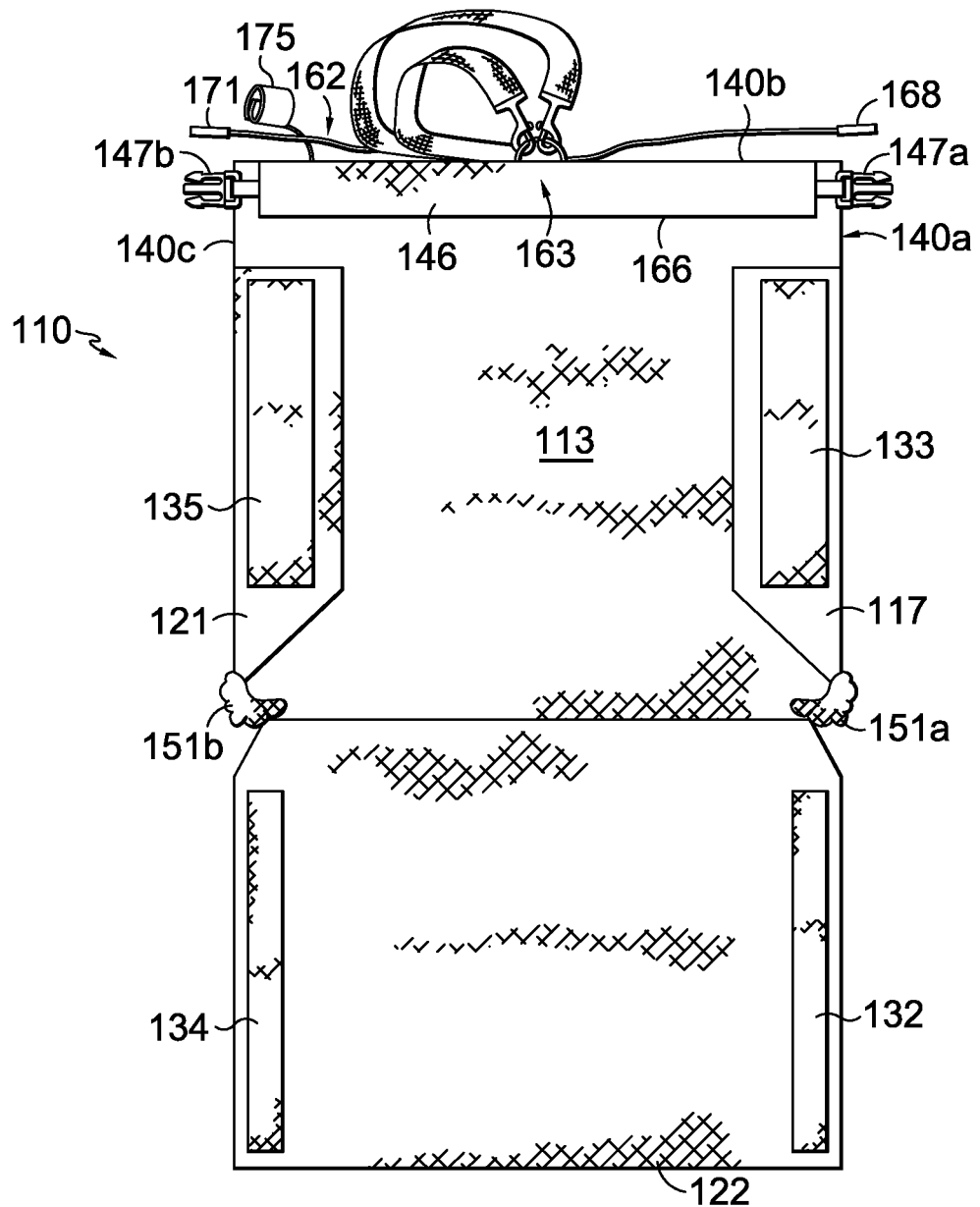
FIG. 2 depicts an aerial perspective of an apparatus in which side panels are connected and a top panel is laid open.

The side panels attach to one another to form walls of an enclosure-forming structure, which includes a space in the middle thereof that is sometimes referred to herein as the "interior space." For example, both front panel 114 and back panel 118 attach to left panel 116 and right panel 120. The side panels might be attached to one another by various means, and in one embodiment, the side panels are sewn together. As such, when a chair is positioned in the space, which is in the middle of the enclosure-forming structure, the side panels contiguously extend around legs of the chair. For example, referring to FIG. 2, another aerial perspective is shown of the apparatus 110. In FIG. 2, the side panels are in a vertical position and are attached to one another, such that FIG. 2 depicts top edges 140a-c of the left panel, back panel, and right panel. In addition, FIG. 2 depicts that a rear security flap 146 is folded inward, the rear security flap being described in more detail herein below. Moreover, FIG. 2 depicts a top portion 117 of left panel 116 and a top portion 121 of right panel 120, both top portions 117 and 121 being folded inward to expose hook-and-loop strips 133 and 135. FIG. 2 also depicts a top surface 113 the base panel 112 and is shaded to depict that a space (i.e., the interior space) exists between all of the side panels.

Referring to FIGS. 1 and 2, apparatus 110 includes a top panel 122 that extends from front panel 114. Top panel 122 might be sewn to or adhered to front panel 114. Alternatively, top panel 122 and front panel 114 might be a single panel. Top panel 122 releasably fastens to one or more other side panels, such as left panel 116 and right panel 120. For example, top panel 122 includes a hook-and-loop strip 132 that mates with another hook-and-loop strip 133 that is positioned on a top portion 117 of left panel 116. In addition, top panel 122 includes another hook-and-loop strip 134 that mates with hook-and-loop strip 135, which is positioned on a top portion 121 of right panel 120.

Figure 3:
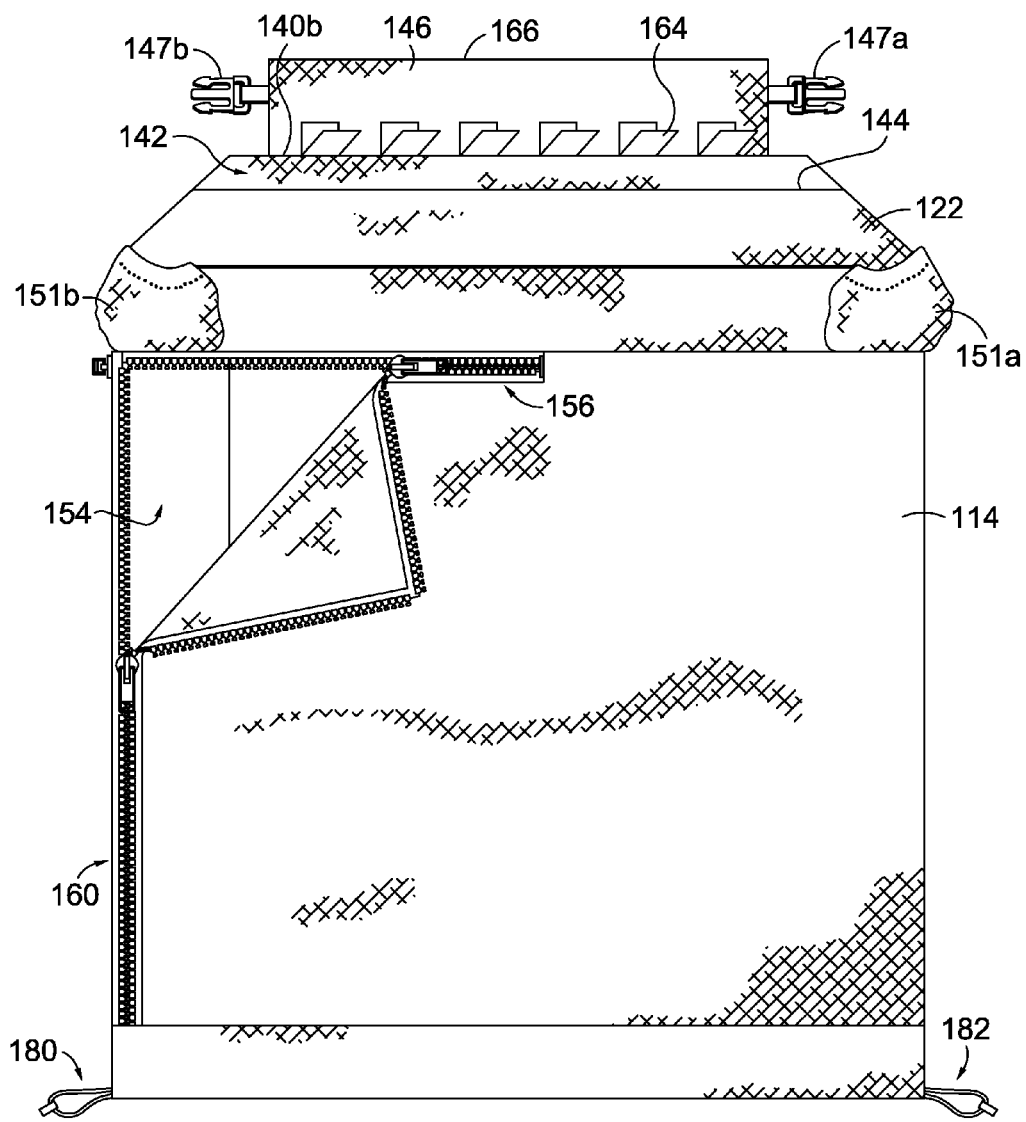
FIG. 3 depicts an elevated front perspective of an apparatus in which side panels are connected and a top panel is laid closed.

Referring to FIG. 3, a front view of the apparatus 110 is shown from a slightly elevated perspective in which the top panel 122 has been folded over to cover the interior space (not seen in FIG. 3) that exists between all of the side panels when in their vertical positions. FIG. 3 depicts that an opening 142 exists between an edge 144 of top panel 122 and a panel-extension portion 146 of the back panel.

Figure 4:
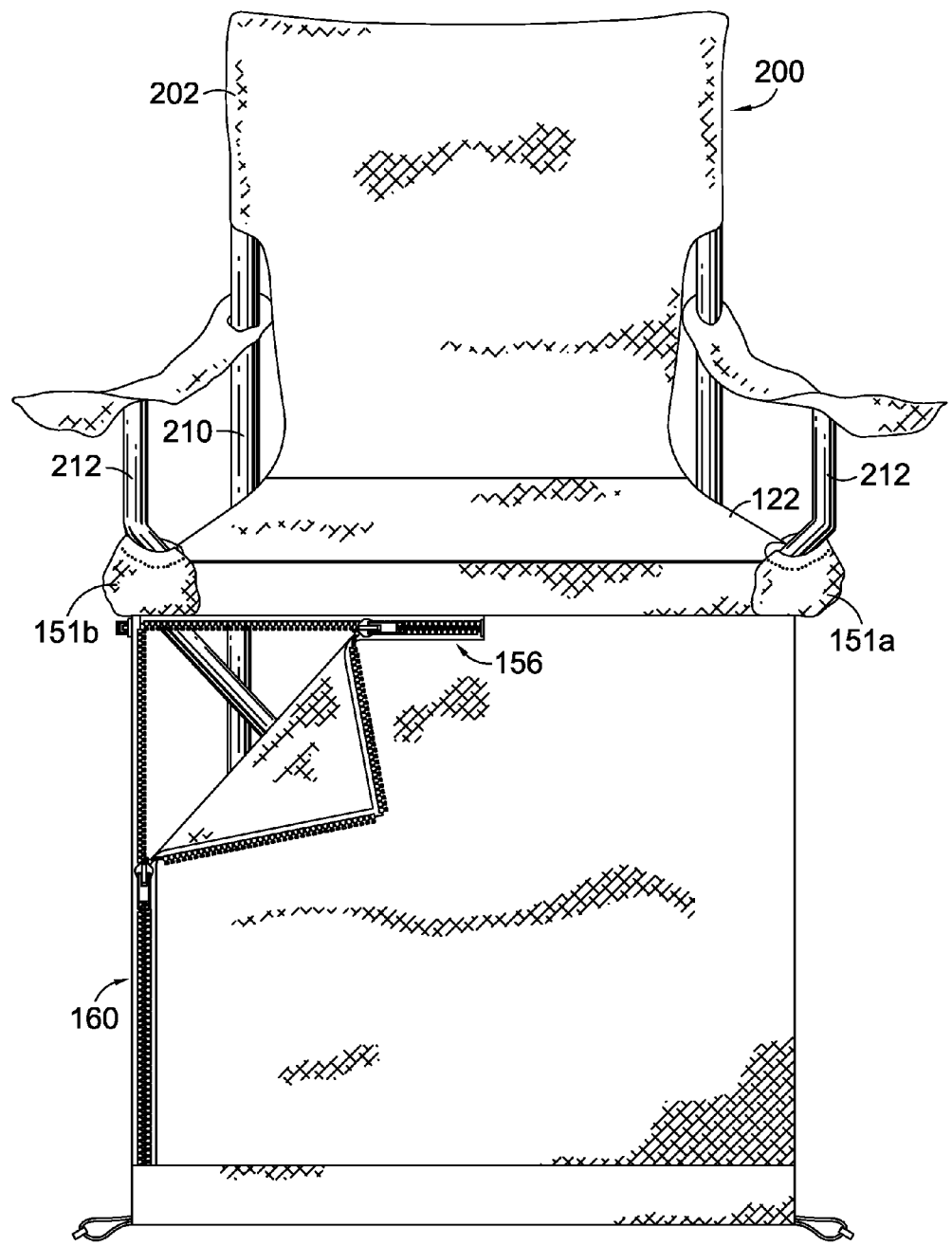
FIG. 4 depicts the apparatus of FIG. 3 in which a chair has been positioned in a space between the side panels.

When using the apparatus 110, a chair might be positioned in the space between the side panels, the space being depicted in FIG. 2. As such, base panel 112 is positioned underneath legs of the chair. In addition, top panel 122 folds over and on top of the chair seat. Top portions 117 and 121 also fold over and on top of the chair seat. Accordingly, the top panel 122 assists to secure the apparatus 110 around the chair when the top panel is releasably fastened (e.g., by hook-and-loop strips 132-135) to the one or more other side panels. Such an arrangement is depicted in FIG. 4, in which top panel 122 is positioned on top of a seat of a chair 200. In addition, the backrest portion 202 of the chair 200 that is depicted in FIG. 4 extends through the opening 142 that is depicted in FIG. 3.

Various features might be included that assist in securing apparatus 110 to a chair. For example, FIG. 1 depicts that left panel 116, right panel 120, and front panel 114 each includes flared upper edges 150a-d which, when joined, create an area at each of the front top corners accommodating various size chair seats. This expandable area at the front top corners is identified by reference numerals 151a and 151b in FIGS. 2-4. Elastic encased within the top edge of the flared expandable areas 151a and 151b, draws the expandable areas 151 and 151b up and around the chair's armrest-support frame 212. Alternatively, a set of gussets might be positioned at a top end of a respective junction (e.g., seam) between side panels, each gusset being positioned such that, when a chair is positioned in the space between the side panels, each gusset wraps around a respective corner of the chair seat. Moreover, each gusset might include a drawstring that allows the apparatus to be tied onto various portions the chair frame that are positioned near each corner of the chair seat.

Other features might also be provided to secure apparatus 110 to a chair. For example, FIGS. 1 and 3 depict clips 164 that are attached to an inside surface of back panel 118. That is, clips 164 are attached near a top of back panel and at a height that is slightly below a top edge 166 of the back panel. For example, clips 164 might be attached near back-panel edge 140b, which includes a seam between back panel 118 and security flap 146. When a chair is positioned in the interior space, clips 164 can be releasably attached to a back edge of the chair seat. By attaching clips 164 to the seat, a gap between the back edge of the seat and the back panel is maintained in a closed position and back panel 118 is held in a desired position. Various types of clips might be used, such as alligator clips or other releasably closable clips. Clips 164 provide added security, such as when a pet is enclosed in the interior space, thereby inhibiting the pet from escaping out of the gap.

Figure 5:
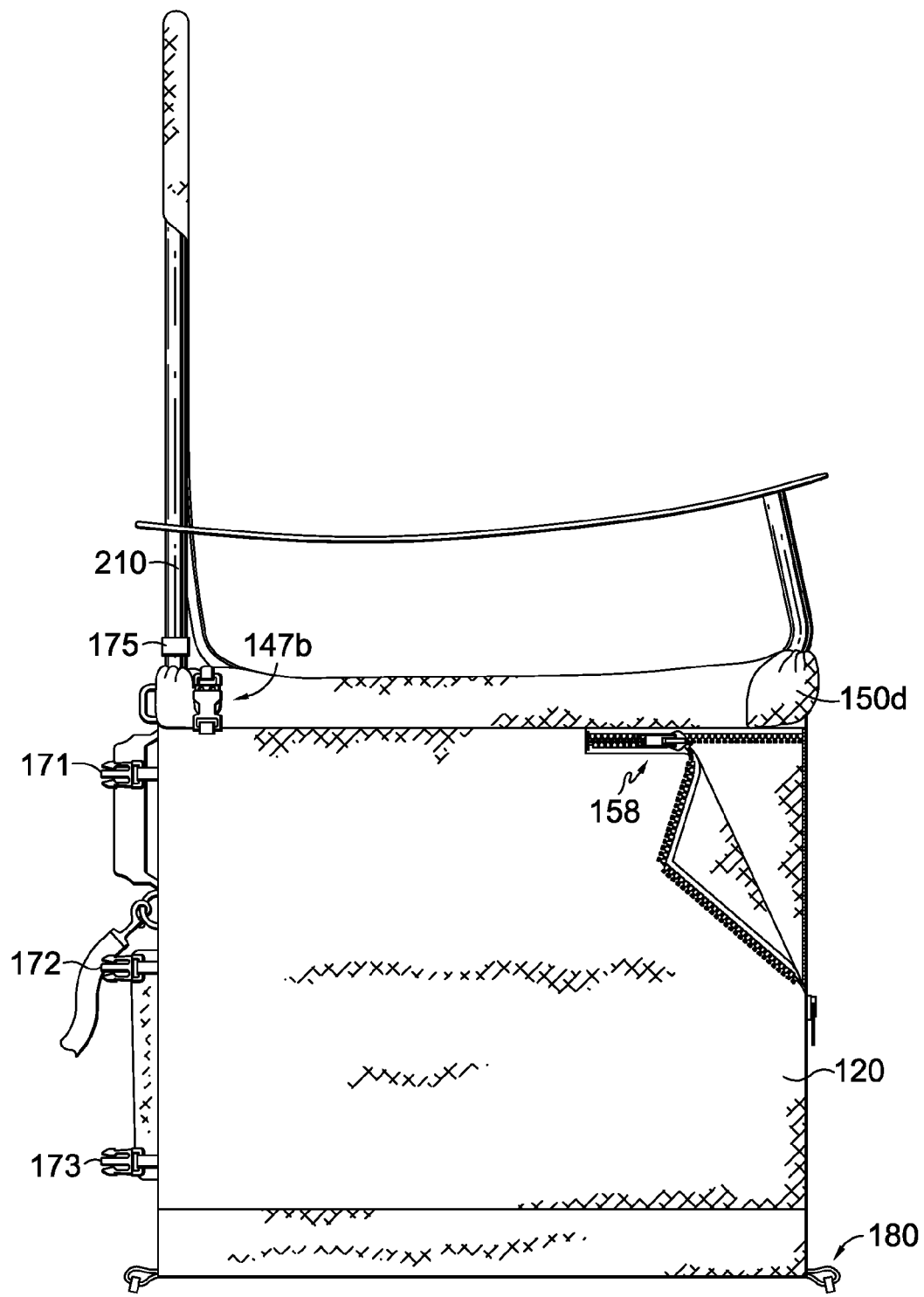
FIG. 5 depicts a right side of an apparatus when a chair is positioned in a space between the side panels.
Figure 13:
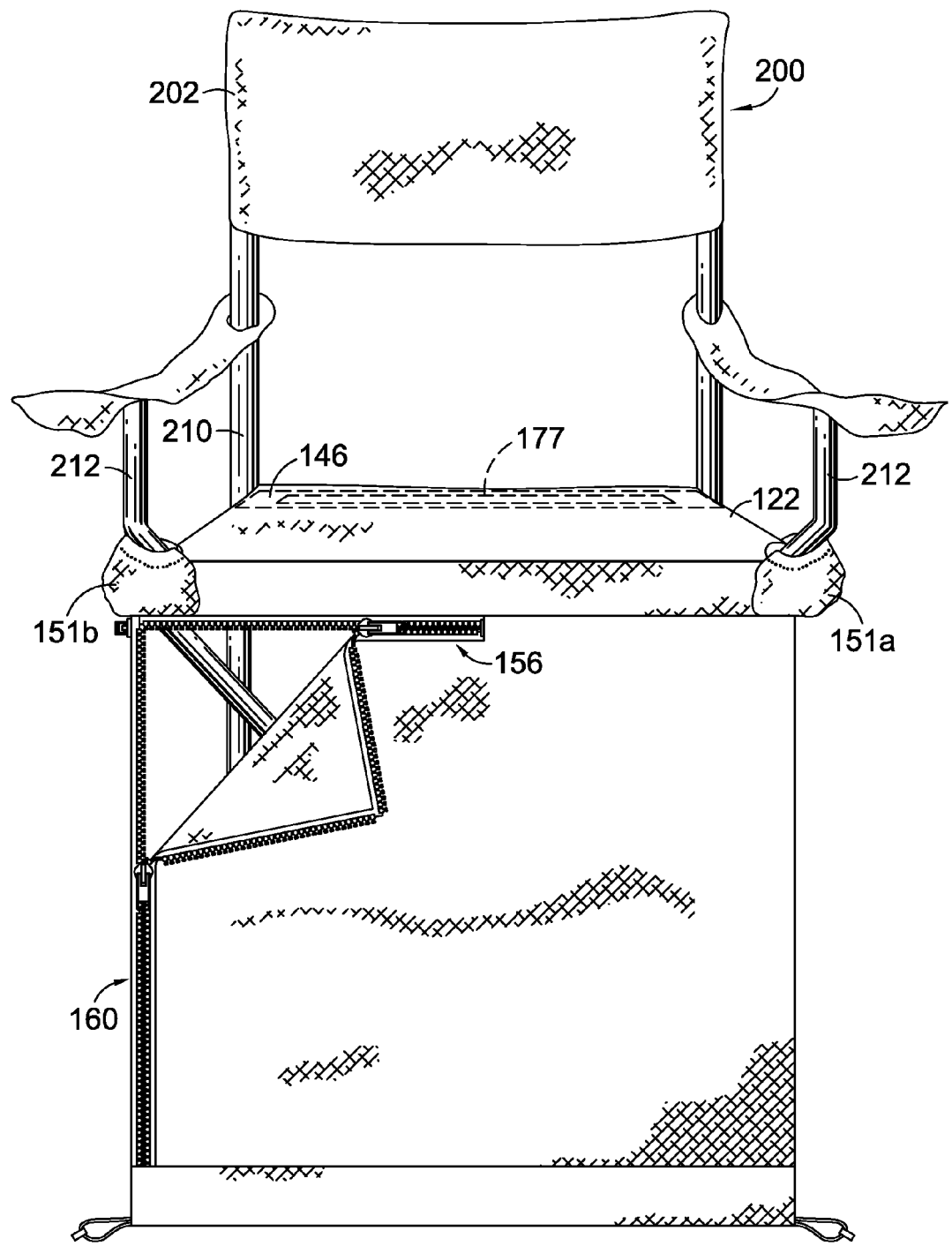
FIG. 13 depicts an alternative embodiment of an apparatus, in which a top panel fastens to a back panel.

Apparatus 110 might also include a back-panel extension 146 that extends from a top portion of the back panel. When a chair is positioned in the interior space, back-panel extension 146 folds over and on top of a back edge of the chair seat. In addition, back-panel extension 146 includes fasteners 147a and 147b that releasably attach to left panel 116 and right panel 120. Examples of such releasable fasteners include hook-and-loop strips, clips, or snaps that include one part fixed to the back-panel extension 146 and a mating component that is fixed to the right panel or left panel. For example, FIG. 5 shows fastener 147b in a clipped mating relationship with a corresponding fastener that is attached to right side panel 120. In one embodiment, clips 164 are used in conjunction with a back-panel extension 146 to secure apparatus 110 around a chair. Referring to FIG. 13, an alternative embodiment is depicted. In FIG. 13, the back-panel extension 146 (depicted in a ghost view beneath top panel 122) does not include clips 164. Instead, the back-panel extension 146 includes a hook-and-loop strip 177 (also depicted in a ghost view beneath top panel 122), onto which a corresponding hook-and-loop strip, which is positioned on a bottom-facing side of top panel 122, attaches. Such an embodiment in which the top panel releasably connects to the back-panel extension might be useful to attach to an open-backed chair 200, similar to the one depicted in FIG. 13.

Apparatus 110 further includes an access opening that is constructed into at least one of the side panels and that provides access to the space in between the side panels. For example, FIG. 3 depicts a zipper 156 that is positioned along a portion of front panel 114. Although zipper 156 is depicted near a top seam of front panel 114, zipper 156 might be positioned anywhere on front panel 114, such as at a position that is below a seat of a chair positioned in the interior space. In FIG. 4, it can be seen that zipper 156 provides access to space underneath the chair seat. Also depicted in FIGS. 3 and 4 is a vertically oriented zipper that runs along a seam between front panel 114 and right side panel 120.

Referring now to FIG. 5, a right-side view is depicted of the apparatus when a chair has been positioned in the space between the vertically oriented side panels. In addition, another zipper 158 is depicted that is positioned on right side panel 120 and zipper 160 is shown again. Zipper 158 might be aligned with zipper 156 and zippers 156, 158, and 160 might collectively provide access to the interior space (e.g., the space underneath the chair seat). That is, zippers 156 and 158 zip toward one another and meet at the seam at a position of zipper 160, which zips upward from near base panel 112. Although FIGS. 3, 4, and 5 depict a zipper on the right side of the apparatus, a zipper might alternatively be positioned on the left side of the apparatus, as depicted in FIG. 1. In addition, although zippers are depicted in the various figures, an opening that provides access to the interior space might be releasably closable using a variety of other releasably closable mechanism, such as hook-and-loop strips, snaps, and clips. Zippers 156, 158, and 160 provide an example of just one configuration that enables access to the interior space. Accordingly, many alternative configurations might also be possible in which an opening is positioned at a different location on one or more of the side panels and using a different closing mechanism. Such configurations might be designed such that an access opening is positioned to avoid interference with chair framing when a user is accessing the interior space.

Figure 6:
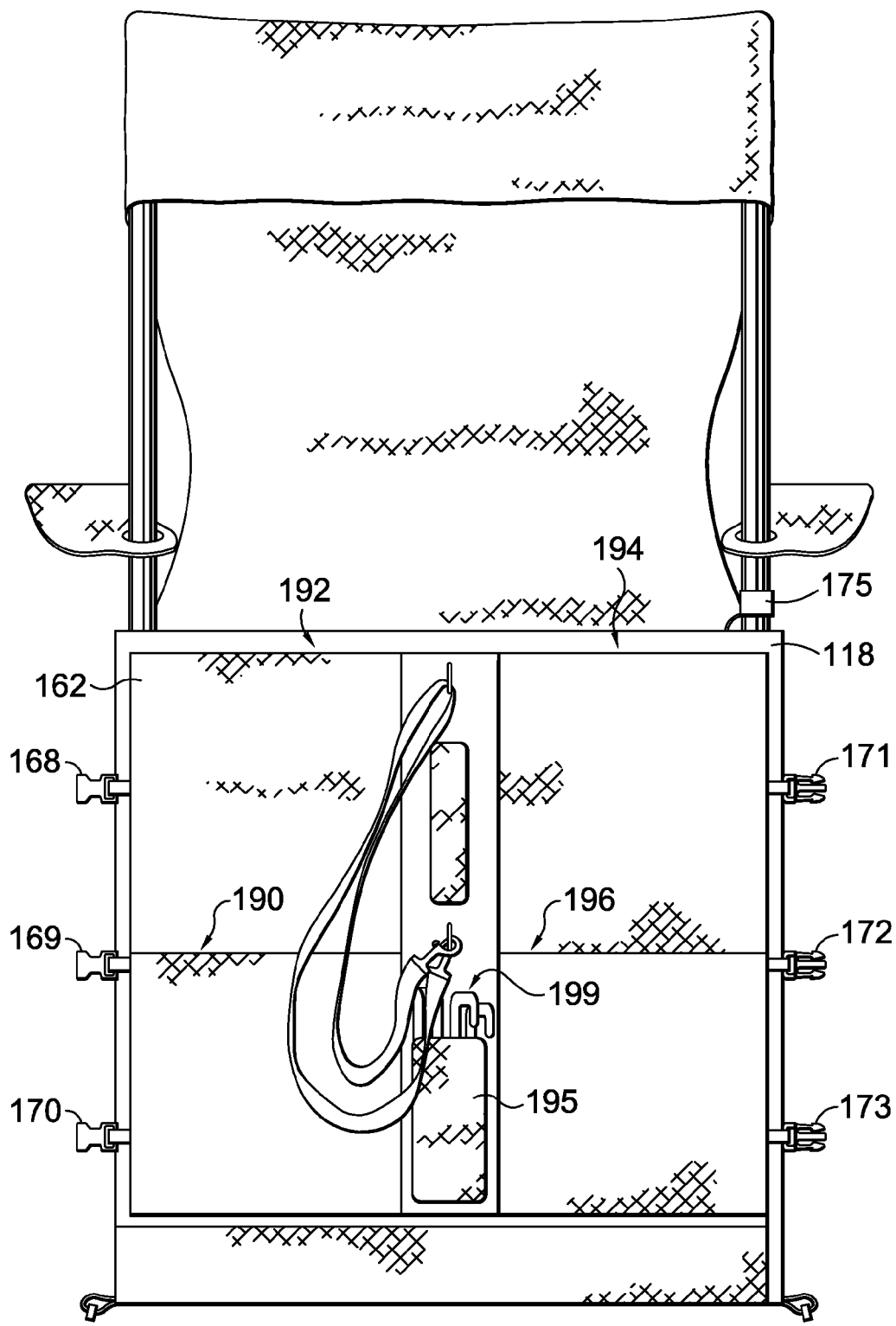
FIG. 6 depicts a back side of an apparatus that includes a wrapping panel and a chair is positioned in a space between the side panels.

Referring back to FIG. 2, a top edge of a wrapping panel 162 is depicted, the wrapping panel 162 being attached adjacent to an outside surface of a back panel 118. Because the wrapping panel 162 is attached to an outside surface of back panel 118, the wrapping panel is not viewable in FIG. 1. Rather a better depiction of the wrapping panel 162 is depicted in FIG. 6, which depicts a head-on view of a backside of apparatus 110.

Wrapping panel 162 might be attached to back panel 118 using various fastening techniques, such as by sewing or adhesive, and in FIG. 2, wrapping panel 162 is depicted as being attached to back panel 118 near a middle of the wrapping panel (the attachment location being identified by reference numeral 163). In other embodiments, wrapping panel might be attached closer to an edge of the wrapping panel or to one of the other side panels. Wrapping panel 162 might include hook-and-loop strips (or some other releasable fastener) that secure wrapping panel 162 to an outside surface of back panel 118 when apparatus 110 is in an open configuration (i.e., not collapsed). That is, while FIG. 2 depicts that side edges of wrapping panel 162 are free and not attached to back panel 118, wrapping panel 162 and back panel 118 might include corresponding hook-and-loop strips (or some other releasable fastener) that allows wrapping panel 162 to be secured more flush against an outside surface of back panel 118.

In another embodiment, wrapping panel 162 is completely removable from back panel 118. For example, wrapping panel 162 might be attached to back panel 118 using only releasable fasteners (e.g., hook-and-loop strips, snaps, clips, zippers, etc). As such, when removed from back panel 118, wrapping panel 162 could be used in other capacities to store items or cover items other than a chair or apparatus 110. For example, a removed wrapping panel 162 might be used as an apron to protect an individual's clothing, such as when the individual is grilling. In such an embodiment, the wrapping panel 162 could be used to store grilling-related items, such as utensils, spices, matches, etc.

Wrapping panel 162 includes releasable fasteners 168-173. When apparatus 110 is collapsed into the interior space, wrapping panel 162 can wrap around the collapsed apparatus 110 (and around any chair that is positioned in the interior space). Releasable fasteners 168-173 are positioned such that they can be coupled when wrapping panel 162 wraps around apparatus 110, thereby securing apparatus 110 in a collapsed configuration. For example, component 168 mates with component 171.

Figure 7:
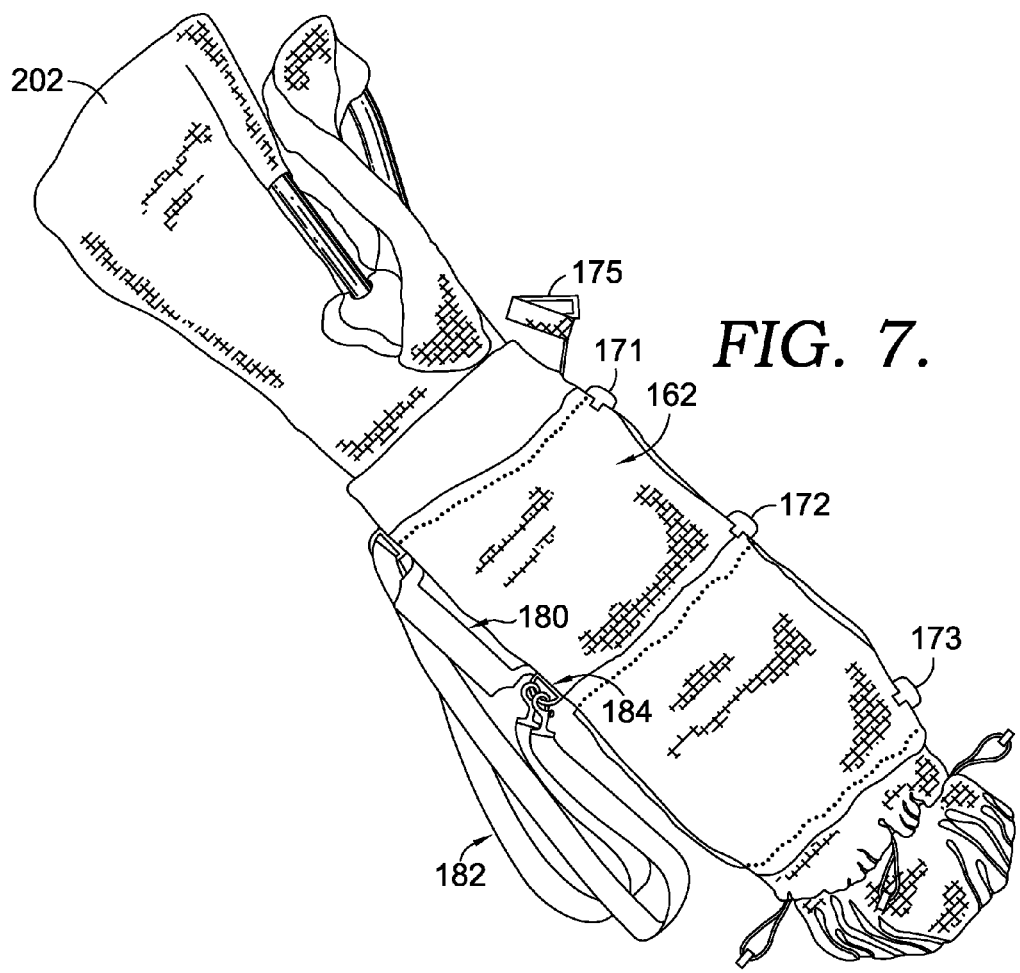
FIG. 7 depicts an apparatus wrapped around a collapsed chair.

Such a collapsed configuration is depicted in FIG. 7 in which wrapping panel 162 is depicted as wrapped around chair, both the chair and apparatus 110 being collapsed. A backrest portion 202 of a collapsed chair is depicted as extending beyond the wrapping panel 162. Portions of releasable fasteners 171, 172, and 173 are depicted in FIG. 7 that are in a mating relationship with fasteners 168, 169, and 170 (not seen in FIG. 7). FIG. 7 also depicts a handle 180 and a carrying strap 182 that can be used to carry the apparatus and the chair and that are attached to the wrapping panel. In this respect, apparatus 110 eliminates the need for a separate carrying bag for the chair. For example, handle 180 might include a plastic molded handle. Carrying strap 182 includes releasable clasps 184 that allow at least one end of carrying strap 182 to be released from wrapping panel 162, such that the carrying strap 182 could also be used as a leash for a pet.

Referring to FIG. 6, wrapping panel 162 also includes pockets 190, 192, 194, 195, and 196 that are constructed on the outside of the wrapping panel. The pockets might be used for storage of various items. In one embodiment, the pockets might be used to hold an ice pack to assist with cooling the interior space, or a hot pack to assist with warming the space. For example, if a back panel 118 is constructed of a mesh, netting, or some similar material, a hot or cold pack placed in one of the pockets 190, 192, 194, or 196 could facilitate heating or cooling the interior space. Such cooling or heating might be particularly useful when the interior space is used as an enclosure for a pet. In one embodiment, pocket 195 stores stakes 199 that can be secured through loops (e.g., 180 and 182) to help prevent apparatus 110 from tipping over. Pockets might be positioned at a variety of other locations on apparatus 110, such as on other side panels or in top panel 122. For example, another pocket might be positioned in top panel 122 to store cushions, heat packs, cold packs, or other items directed to enhancing user comfort.

Although wrapping panel 162 is depicted in various figures, in another embodiment a wrapping strap might be included instead. That is, a wrapping strap might be attached to one of the side panels, the wrapping strap including releasable fasteners (e.g., clips) that are connectable when apparatus 110 is collapsed. A wrapping strap might include a flexible member that includes some or no elasticity and that wraps around the apparatus and the chair (similar to wrapping panel 162) when the apparatus and chair are collapsed.

In a further embodiment, apparatus 110 includes another releasable fastener 175 that attaches to a rear chair upright when a chair is positioned in the interior space. The releasable fastener 175 depicted in various figures includes a hook-and-loop strip; however, fastener 175 might alternatively include a spring-loaded clip a clamp, or other fastener. In one embodiment, releasable fastener 175 includes a hook-and-loop strip that includes a rubberized surface. The rubberized surface provides a desired amount of tackiness, such that when the strip is wrapped around a chair frame (e.g., rear frame upright), the strip does not easily slide. The releasable fastener 175 might be attached to and extend from either one of the side panels (e.g., back panel 118) or wrapping panel 162 and is attachable to a chair frame (e.g., rear chair upright 210) just above the chair seat back edge. By securing releasable fastener 175 at such a position on the chair frame, the chair seat is inhibited from sliding up the chair frame, thereby inhibiting an accidental collapse of the chair.

The apparatus might also include loops 180 and 182, as seen in FIG. 3, that are constructed into a base of apparatus 110. Loops might be constructed at all four corners of a base of the apparatus 110, even though not all four corners are viewable in FIG. 3. The loops are positioned to receive stakes that, when secured into the ground through the loops, help to prevent a combination of apparatus 110 and a chair from tipping over. For example, if a pet were enclosed in the interior space, and a chair were not occupied, the stake-and-loop combination would help to prevent the chair and apparatus from accidentally tipping over.

Figure 8:
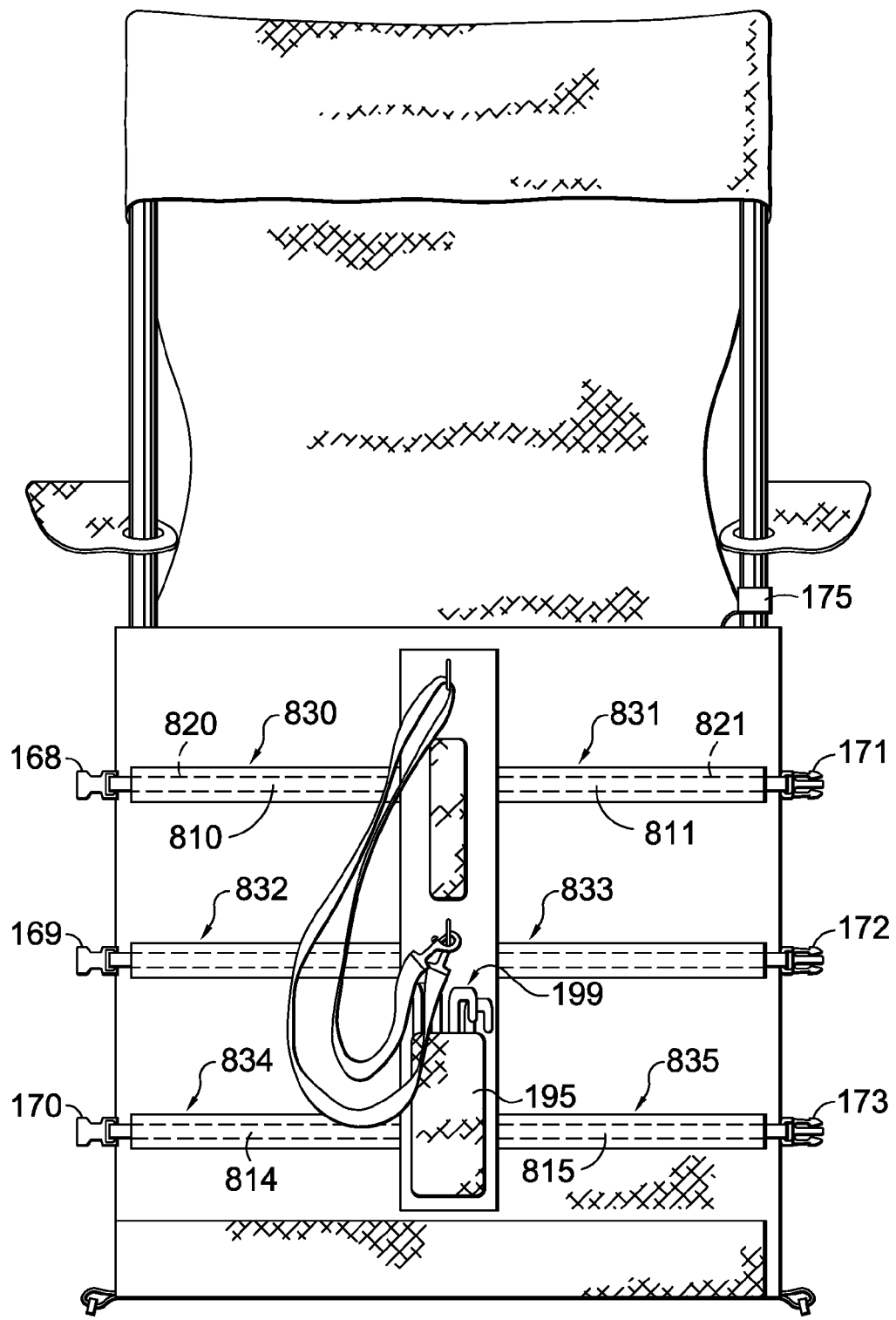
FIG. 8 depicts an apparatus in which wrapping elements are constructed into a back panel.

Referring now to FIG. 8, another embodiment is depicted that does not include a wrapping panel. Instead, elements are sewn or otherwise attached directly into casings 810-815, which are constructed in back panel 818. For example, wrapping straps 820 and 821 might be positioned in casings 810 and 811 (respectively). Accordingly, when the apparatus is collapsed into an interior space, ends of the wrapping straps are connectable (i.e., using fasteners 168-173) to hold the apparatus in a collapsed arrangement. FIG. 8 also depicts that pockets 830-835 could also be sewn into back panel 818.

Although the various figures depict a wrapping panel 182 that is similar in height to the other side panels, in another embodiment, a wrapping panel might be taller and extend higher up the backside of a chair positioned in the interior space. Such a vertically extended wrapping panel might attach to a chair rear upright using one or more releasable fasteners, such as clips, clamps, or hook-and-loop strips. A vertically extended wrapping panel would provide more coverage of the collapsed unit. For example, a vertically extended wrapping panel would provide more coverage of the chair backrest 202 that is depicted in FIG. 7.

Figure 9:
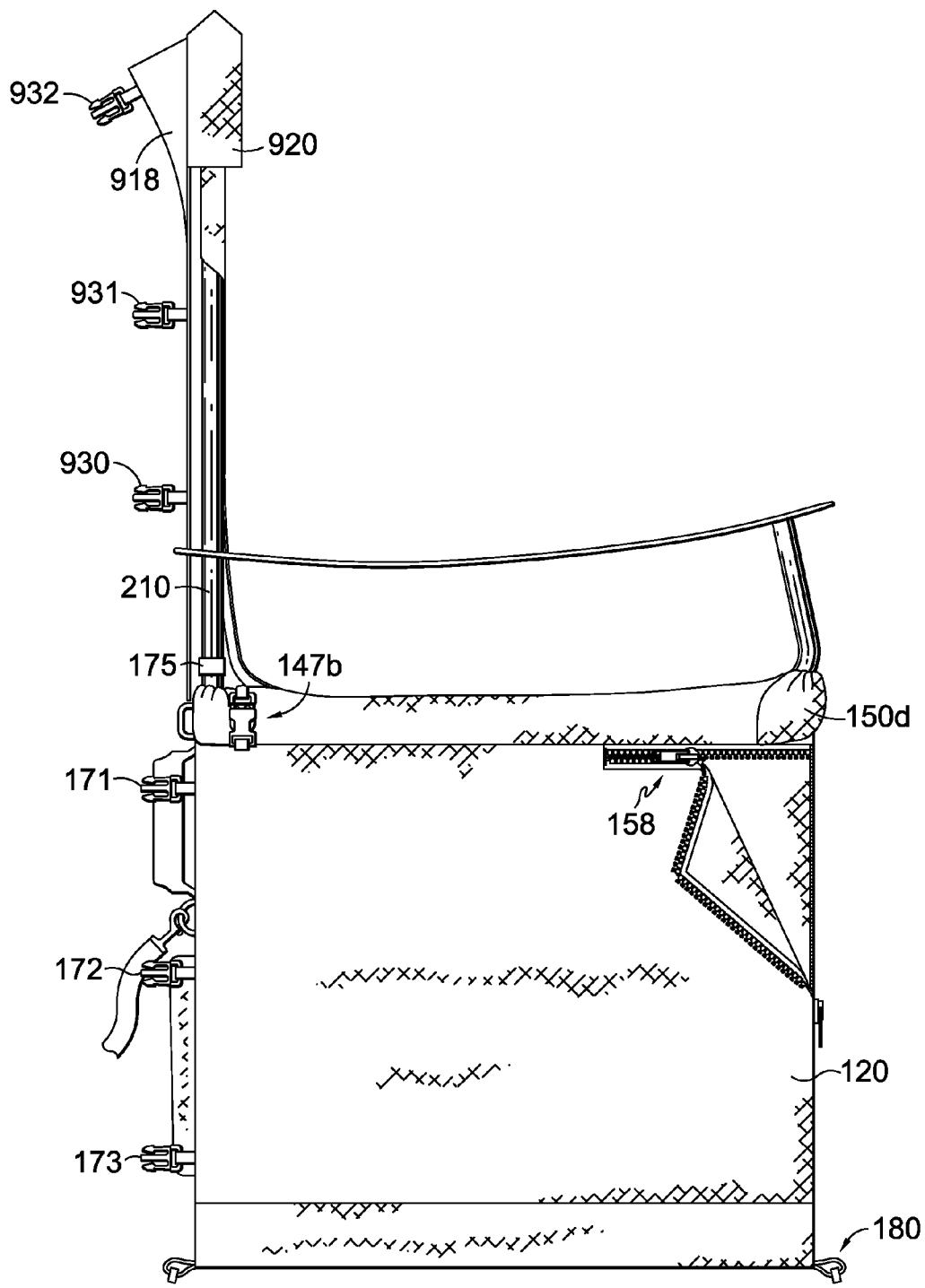
FIG. 9 depicts an apparatus that includes a vertically extended wrapping panel.
Figure 10:
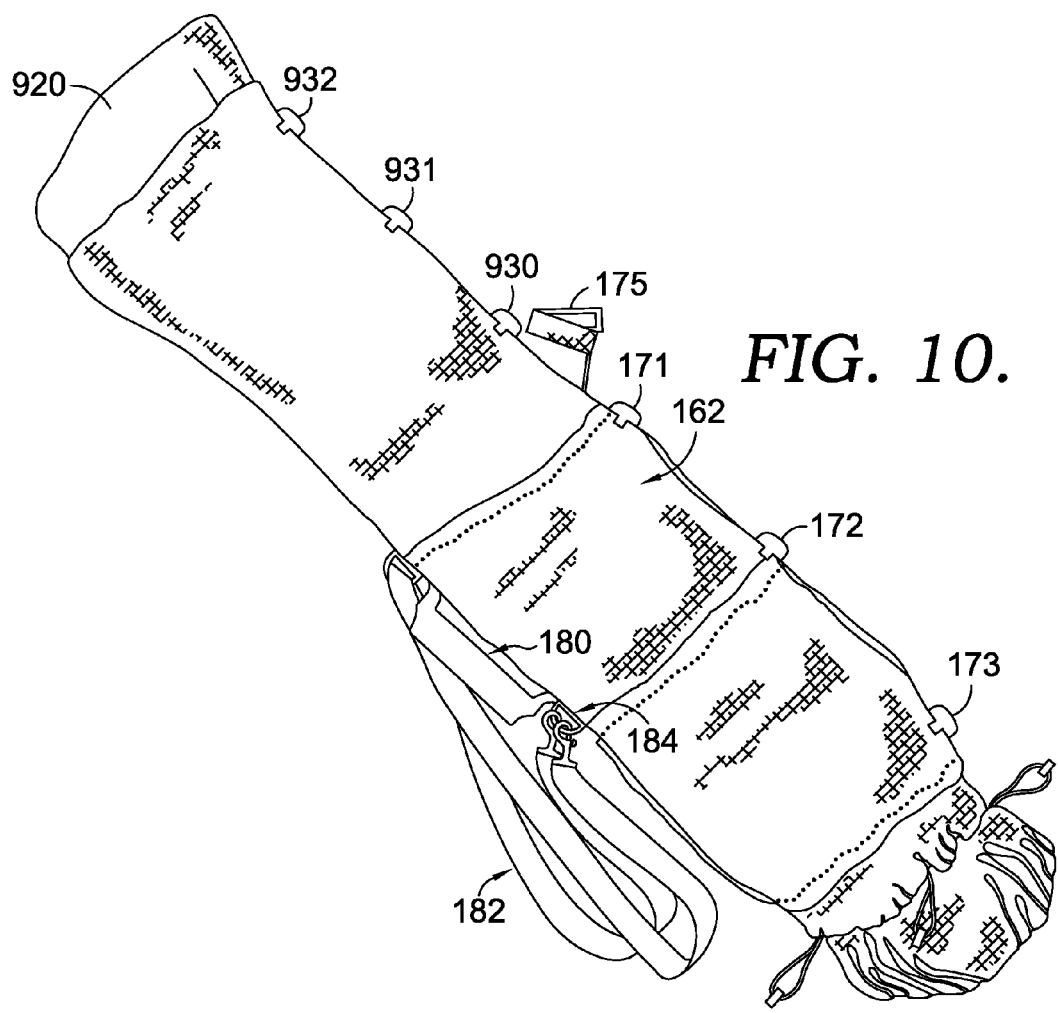
FIG. 10 depicts the apparatus of FIG. 9 in a collapsed arrangement.

An example of such a vertically extended wrapping panel 918 is depicted in FIGS. 9 and 10. Depicted is vertically extended wrapping panel 918 that extends the full height of the chair backrest. In such an embodiment, a bottom portion of the vertically extended wrapping panel might be attached to back panel 118 (as described with respect to wrapping panel 162), whereas a top portion of the wrapping panel attaches to a top edge of the backrest. The top portion might attach to a top edge in various ways. For example, the top portion of the vertically extended wrapping panel might include a slipcover-like pocket 920 that slips over the top of the chair seatback when the chair is positioned in the interior space. In addition to releasable fasteners 171-173 (described with respect to FIG. 6), wrapping panel 918 includes releasable fasteners 930-932 that assist to hold the apparatus in a collapsed configuration. Although not identified in FIG. 9, an extended wrapping panel might include additional pockets positioned in an upper portion of the extended wrapping panel.

As depicted in FIG. 10, the wrapping panel 918 could remain attached to the top edge of a chair back, even when the chair is collapsed, thereby allowing the wrapping panel 918 to enclose both the chair legs and the chair backrest. Such a collapsed arrangement is depicted in FIG. 10, in which the slip-cover-like pocket 920 remains positioned over a top edge of a chair back. In addition, clip portions 171-173 and 930-932 are all depicted as clipped to help secure the apparatus in a collapsed arrangement.

In a further embodiment, the back panel might be vertically extended, in addition to the wrapping panel. For example, the back panel might extend further above extension 146 and include a slipcover-like pocket that slips over and attaches to a top edge of a chair backrest. In such an embodiment, the wrapping panel extends the full height of the back panel and would wrap the entire upper portion of the chair as well as the lower portion.

In an alternative embodiment, base panel 112 is not included in apparatus 110. Instead, a rigid member is encased in a vertical orientation, such as along the length of the side edges of the wrapping panel (e.g., close to fasteners 168-173), or along the center of the wrapping panel (i.e., behind the shoulder strap, handle, and stake pocket). The rigid member functions to prevent apparatus 110 from sliding up the chair legs and crumpling onto itself when being used to carry the chair in a collapsed configuration. A "baseless" apparatus might include the various sides depicted in FIGS. 1-8. In addition, a baseless apparatus might include an extended wrapping panel, as depicted in FIGS. 9 and 10.

Figure 11A:
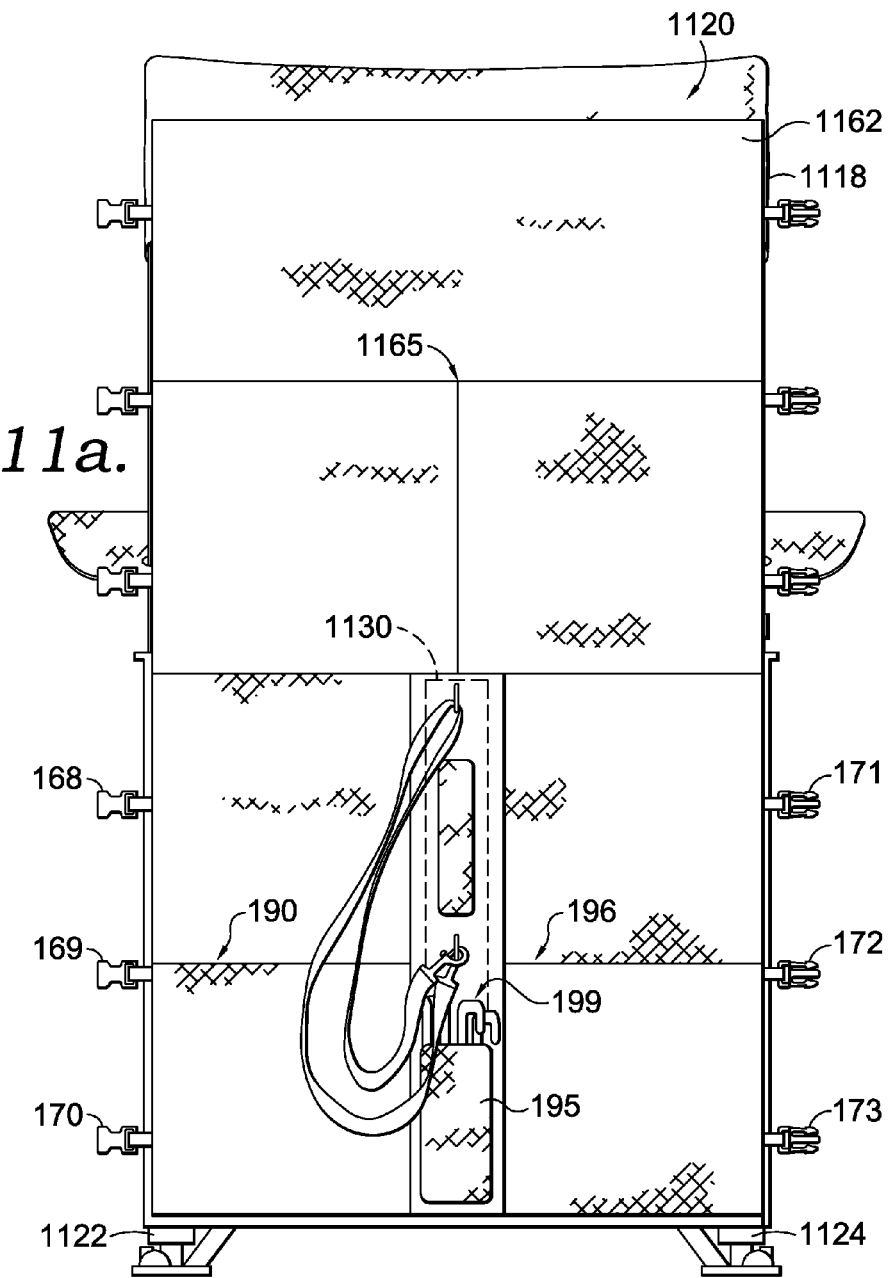
FIG. 11 depicts an apparatus that does not include a base panel.
Figure 11B:
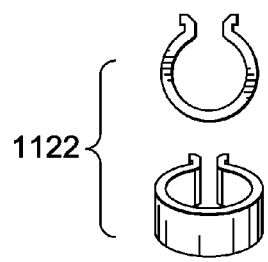

One embodiment of a baseless apparatus is depicted in FIG. 11*a*, which includes an extended wrapping panel 1162 that is attached onto an extended back panel 1118. For example, the extended wrapping panel 1162 is attached (e.g., stitched or adhered) along a central portion 1165 to the extended back panel 1118. In such an embodiment, the extended back panel 1118 includes a slip-cover-like pocket 1120 that attaches to a top of a chair back. In addition, the back panel 1118 includes clips (such as clips 164 depicted in FIGS. 1 and 3) that attach to a rear seat ledge, thereby further securing the extended back panel 1118 to a chair. Back panel 1118 also includes clips 1122 and 1124 that are designed to clamp onto a tubular framing of the chair. As depicted in a callout view 11*b*, clips 1122 and 1124 have flexible prongs that allow the clamp to open and securely fit onto a tubular member. In addition, clips 1122 and 1124 might slide up and down the tubular member as needed to adjust a fit of the apparatus around a chair when the chair and apparatus are being altered between an open configuration and a collapsed configuration. Although clips 1122 and 1124 are depicted for illustrative purposes, a variety of other mechanisms (e.g., ties) might be used to slidably attach the panel to the chair legs. Also depicted in FIG. 11 is a pocket 1130, that is constructed into the apparatus and that can receive the rigid member described above.

Figure 12:
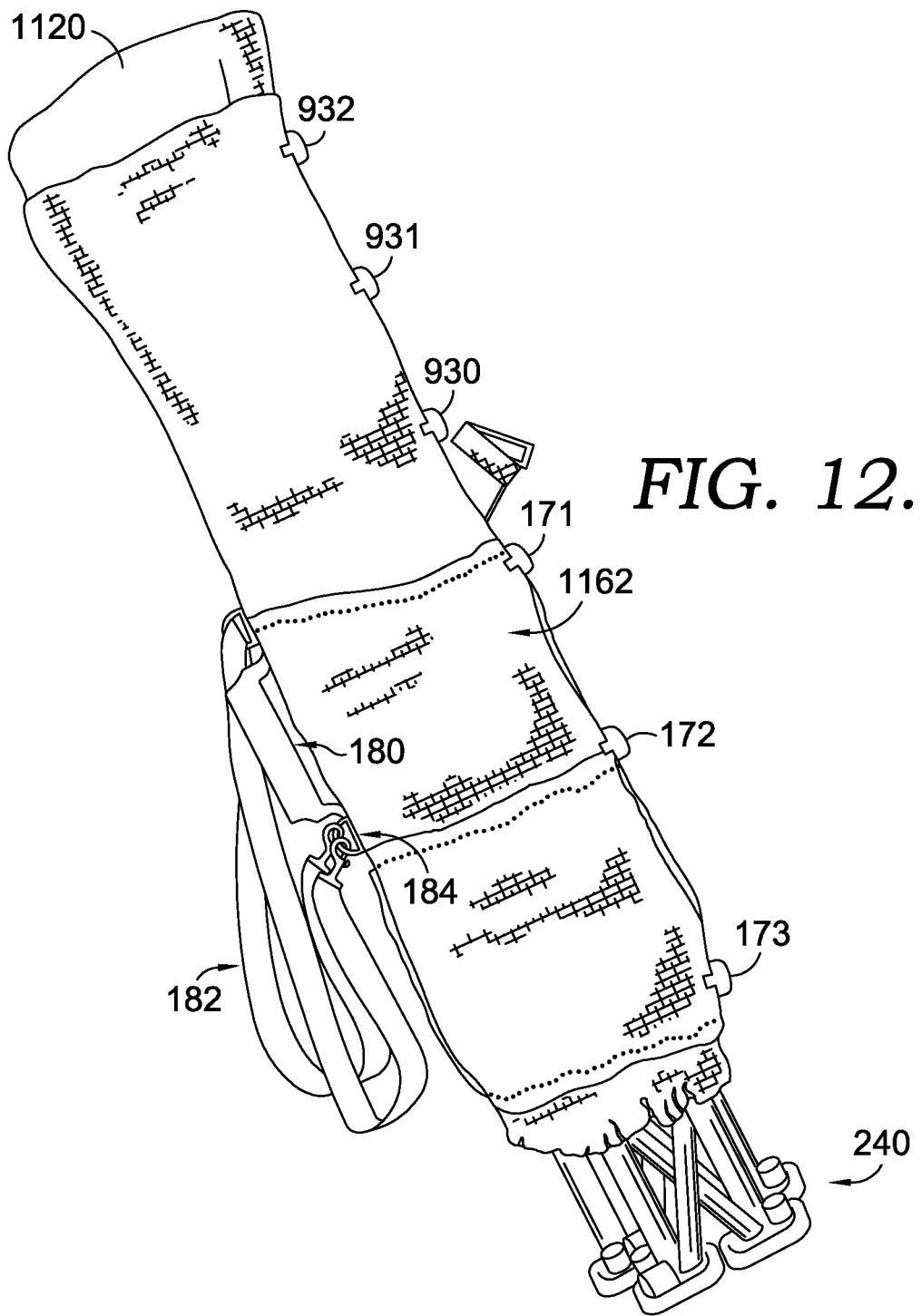
FIG. 12 depicts the apparatus of FIG. 11 in a collapsed arrangement.

FIG. 12 depicts a baseless apparatus in a collapsed configuration and wrapped around a chair. Legs 240 of the chair are depicted as exposed. However, with the functionality provided by the slip-cover-like pocket 1120, clips 171-173 and 930-932, and clips 1122 and 124, the apparatus (i.e., extended back panel and extended wrapping panel) remains secured onto the chair in the collapsed arrangement, such that the apparatus can be used to assist with transportation and storage of the chair.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An apparatus that attaches to a chair to enclose a space underneath the chair, which includes chair legs that support a chair seat, the apparatus comprising:
   a base panel that fits underneath each foot of the chair legs, the base panel having base-panel edges;
   a set of side panels,
      wherein each side panel of the set of side panels is attached to a respective base-panel edge, and
      wherein each side panel is attached to side panels that are adjacent thereto, such that the set of side panels contiguously extends around the chair legs when the base panel is positioned underneath each foot of the chair legs; and
   a top panel that extends from one of the side panels and that releasably fastens to one or more other side panels, wherein the top panel fits over the chair seat when the base panel is positioned underneath each foot of the chair legs, such that the top panel attaches the apparatus to the chair when the top panel is releasably fastened to the one or more other side panels.

2. The apparatus of claim 1, wherein the set of side panels includes a front panel, a back panel, a right panel, and a left panel; and wherein the front panel is the one of the side panels from which the top panel extends.

3. The apparatus of claim 2, wherein the top panel releasably fastens to the left panel and the right panel, and wherein the top panel does not attach to the back panel, such that an opening is provided between the top panel and the back panel.

4. The apparatus of claim 3, wherein the top panel releasably fastens to the left panel and the right panel by hook-and-loop strips, zippers, snaps, or clips.

5. The apparatus of claim 2 further comprising, a set of gussets, each of which is positioned at a top end of a respective junction between side panels, such that each gusset is positioned opposite the base panel.

6. The apparatus of claim 2 further comprising, an access opening that extends at least partly through at least one of the side panels, wherein the access opening is releasably closable and provides access to the space underneath the chair when the set of side panels contiguously extend around the chair legs.

7. The apparatus of claim 6, wherein the access opening is releasably closable using hook-and-loop strips, zippers, snaps, or clips.

8. The apparatus of claim 2 further comprising, a securing mechanism attached near an upper portion of the back panel, wherein the securing mechanism releasably attaches to at least one of the left panel and the right panel.

9. The apparatus of claim 8, wherein the securing mechanism includes a clip, a snap, or hook-and-loop strips.

10. The apparatus of claim 2, wherein an inside surface of the back panel includes one or more releasable fasteners attached thereto that are positioned to attach to a back edge of the chair seat.

11. The apparatus of claim 1 further comprising, a wrapping mechanism that is attached to one of the side panels and that includes a releasable fastener,
   wherein the wrapping mechanism wraps around the side panels when the apparatus is collapsed, and
   wherein the releasable fastener is positioned to be fastened when the wrapping mechanism wraps around the side panels, thereby securing the apparatus in a collapsed configuration.

12. The apparatus of claim 11, wherein the wrapping mechanism includes one or more wrapping straps.

13. The apparatus of claim 11, wherein the wrapping mechanism includes a wrapping panel.

14. The apparatus of claim 13, wherein the wrapping panel includes a releasably attachable securing mechanism that attaches to a rear chair upright, thereby inhibiting sliding of the chair seat along the rear chair upright.

15. The apparatus of claim 13,
   wherein the wrapping panel includes a wrapping-panel height that is greater than a side-panel height of the one of the side panels to which the wrapping panel is attached, and
   wherein the wrapping panel includes a releasably attachable securing mechanism that attaches to a backrest portion of the chair.

16. The apparatus of claim 11, wherein the one of the side panels to which the wrapping mechanism is attached includes a side panel height that enables the one of the side panels to extend along a backside of a backrest portion of the chair and releasably attach to a top of the backrest portion when the apparatus is secured onto the chair.

17. An apparatus that attaches to a chair to enclose a space underneath the chair, which includes chair legs that support a chair seat, the apparatus comprising:
   a set of side panels including a front panel, a back panel, a right panel, and a left panel, wherein each side panel is attached to side panels that are adjacent thereto, such that the set of side panels contiguously extends around the chair legs when the apparatus is attached to the chair;
   a top panel that extends from the front panel that releasably fastens to the left panel and the right panel, wherein the top panel fits over the chair seat, such that the top panel attaches the apparatus to the chair when the top panel is releasably fastened to the one or more other side panels, and wherein the top panel does not attach to the back panel, such that an opening is provided between the top panel and the back panel; and
   a wrapping mechanism that is attached to one of the side panels and that includes a releasable fastener,
      wherein the wrapping mechanism wraps around the side panels when the apparatus is collapsed, and
      wherein the releasable fastener is positioned to be fastened when the wrapping mechanism wraps around the side panels, thereby securing the apparatus in a collapsed configuration.

18. The apparatus of claim 17 further comprising, a rigid member that is secured within the set of side panels, the wrapping mechanism, or a combination thereof.

19. The apparatus of claim 18, wherein the wrapping mechanism includes a wrapping panel and wherein the rigid member is secured within the wrapping panel to inhibit a wrapping-panel top edge and wrapping-panel bottom edge from crumpling into a middle portion of the wrapping panel.

20. An apparatus that attaches to a chair to enclose a space underneath the chair, which includes chair legs that support a chair seat, the apparatus comprising:
   a base panel that fits underneath the chair legs, the base panel having base-panel edges;
   a set of side panels,
      wherein each side panel of the set of side panels is attached to a respective base-panel edge, and wherein each side panel is attached to side panels that are adjacent thereto, such that the set of side panels contiguously extends around the chair legs when the base panel is positioned underneath the chair legs;

a top panel that extends from one of the side panels and that releasably fastens to one or more other side panels, wherein the top panel fits over the chair seat, such that the top panel attaches the apparatus to the chair when the top panel is releasably fastened to the one or more other side panels; and a wrapping panel that is attached to a back panel of the set side panels and that includes a releasable fastener, which is positioned to be fastened when the wrapping mechanism wraps around the set side panels, thereby securing the apparatus in a collapsed configuration, wherein the wrapping panel includes a wrapping-panel height that is greater than a back-panel height of the back panel, and wherein the wrapping panel includes a releasably attachable securing mechanism that attaches to a backrest portion of the chair.

* * * * *